J. KELLET.
Ore Mill.

No. 107,503. Patented Sept. 20, 1870.

Witnesses:
A. Bennewendorf
L. S. Mabie

Inventor:
J. Kellet
Per _____
Attorneys.

N. PETERS, PHOTO-LITHOGRAPHER, WASHINGTON, D.C.

United States Patent Office.

JOHN KELLET, OF ELIZABETH PORT, NEW JERSEY.

Letters Patent No. 107,503, dated September 20, 1870.

IMPROVEMENT IN MUD AND ORE-MILLS.

The Schedule referred to in these Letters Patent and making part of the same

*To all whom it may concern:*

Be it known that I, JOHN KELLET, of Elizabeth Port, in the county of Union and State of New Jersey, have invented a new and useful Improvement in Mud and Ore-Mills; and I do hereby declare that the following is a full, clear, and exact description thereof, which will enable others skilled in the art to make and use the same, reference being had to the accompanying drawing forming part of this specification.

My invention relates to mud and ore-mills, and consists in the construction and arrangement of parts as hereinafter specified.

Figure 1:
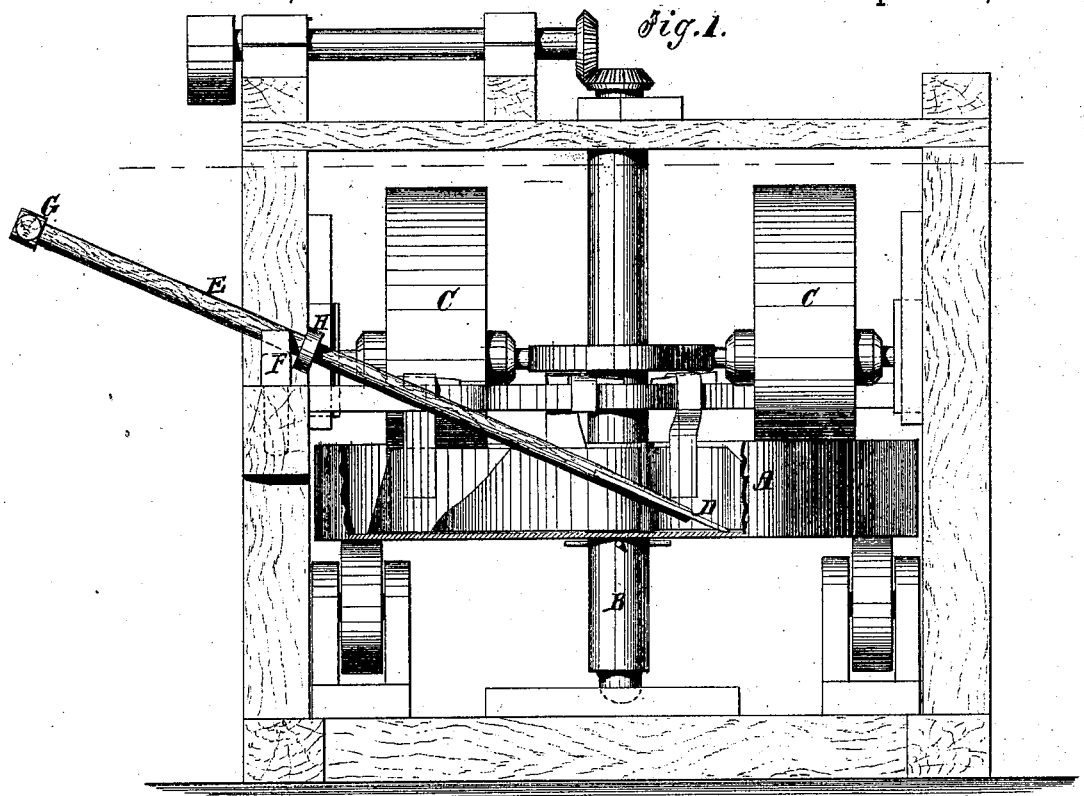
Figure 2:
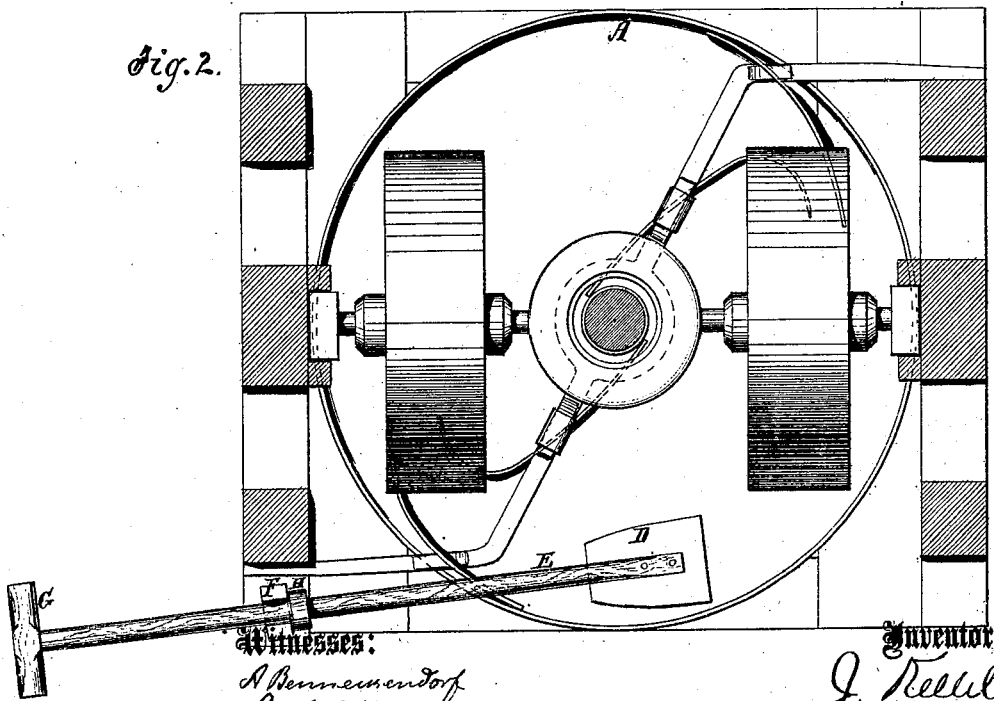

Figure 1 represents a side elevation of a mill, with my improved arrangement of shoveling apparatus, and Figure 2 is a horizontal section of the same.

Similar letters of reference indicate corresponding parts.

A is the large iron pan, arranged to revolve on the horizontal axis B.

C are the crushing-rollers, working within the pan on the substance contained in it. In fig. 2 are shown two pairs of curved plates or scrapers, by which the clay or other substance is guided to the wheels C.

D is the shovel, attached to the long arm or sweep E, which is balanced, or nearly so, in the crotched support F, arranged on the frame relatively to the pan, so that an attendant, taking hold of the handle G of the lever, may swing the lever into and out of the pan over the rim thereof, and turn it on its axis, the said support F being arranged to oscillate on its vertical axis, and the sweep to oscillate on its support. The said shovel is so arranged that the pan will turn against the edge of the blade when the latter is projecting into it, whereby the contents thereof will be forced up onto the shovel. The collar H on the sweep prevents the shovel from being forced back. In this way the ground substance may be removed from the pan, while running, more easily than when standing still, and without danger to the attendant.

Having thus described my invention,

I claim as new and desire to secure by Letters Patent—

The arrangement of the revolving pan A with the shovel D, collared sweep E, and pivoted fulcrum F, constructed and operating as herein described, and for the purpose set forth.

The above specification of my invention signed by me this 6th day of December, 1869.

JOHN X KELLET.
his mark.

Witnesses:
  GEO. W. MABEE,
  ALEX. F. ROBERTS.